US006939598B2

(12) United States Patent
Heckel et al.

(10) Patent No.: US 6,939,598 B2
(45) Date of Patent: Sep. 6, 2005

(54) FLOOR COVERING MADE OF AN ELASTOMER MATERIAL HAVING A RELIEF-TYPE PATTERNED SURFACE

(75) Inventors: Klaus Heckel, Gorxheimertal (DE); Alfons Butscher, Birkenau (DE); Peter Spissinger, Mörlenbach (DE)

(73) Assignee: Firma Carl Freudenberg, Weinheim (DE)

( * ) Notice: Subject to any disclaimer, the term of this patent is extended or adjusted under 35 U.S.C. 154(b) by 367 days.

(21) Appl. No.: 09/921,660

(22) Filed: Aug. 3, 2001

(65) Prior Publication Data

US 2002/0037394 A1 Mar. 28, 2002

(30) Foreign Application Priority Data

Aug. 7, 2000 (DE) ..................................... P 100 39 118

(51) Int. Cl.[7] ............................ B32B 3/00; B32B 1/00; B32B 3/10

(52) U.S. Cl. ...................... 428/156; 428/155; 428/152; 428/187; 428/131; 428/136; 428/147

(58) Field of Search ................................ 428/156, 155, 428/152, 187, 159, 147, 131, 136, 908.8, 913.3, 492, 327; D6/582, 583; D5/55–62

(56) References Cited

U.S. PATENT DOCUMENTS

| | | | | |
|---|---|---|---|---|
| 2,875,543 A | * | 3/1959 | Sylvester et al. | 428/30 |
| 5,154,868 A | * | 10/1992 | Heckel et al. | 264/162 |
| 5,670,237 A | * | 9/1997 | Shultz et al. | 428/173 |

FOREIGN PATENT DOCUMENTS

| | | | | |
|---|---|---|---|---|
| DE | 1 018 209 | | 10/1957 | |
| DE | 37 30 882 | | 3/1989 | |
| EP | 0 399 959 | | 11/1990 | |
| FR | 2 297 969 | | 8/1976 | |
| GB | 2151277 A | * | 7/1985 | E04B/5/00 |

* cited by examiner

*Primary Examiner*—Harold Pyon
*Assistant Examiner*—Catherine A. Simone
(74) *Attorney, Agent, or Firm*—Kenyon & Kenyon

(57) ABSTRACT

A floor covering made of an elastomer material having a relief-type patterned surface (2) which is provided with irregularly distributed indentations (3), which have an elongated shape, which partially contact and/or intersect each other, and which have a depth (T) of 0.02 mm to 0.2 mm, at a width (B) of 0.2 mm to 2.5 mm and a length (L) of 5 mm to 50 mm.

15 Claims, 1 Drawing Sheet

FLOOR COVERING MADE OF AN ELASTOMER MATERIAL HAVING A RELIEF-TYPE PATTERNED SURFACE

BACKGROUND OF THE INVENTION

1. Field of the Invention

The invention relates generally to different materials, colors, and patterns used for floor coverings, depending on the use. More particularly, the invention relates to high-wear floor coverings, for example in public buildings, and to floor coverings made of an elastomer material, which are highly scuff resistant and which maintains an attractive appearance over an extended time.

2. Description of Related Art

From the published European patent application, European Patent 0 399 959 A1, a floor covering made of elastomer material is known, which is furnished with convex relief-structures. The height of the relief-structures amounts to between 0.2 mm and 1.0 mm. They are arranged in groups and are provided with mirroring surfaces, so that the floor takes on a different appearance depending on the angle at which it is viewed. Although the floor covering itself is monochromatic, it achieves the desired effect of a varied coloring as a result of the mirror surfaces. Disadvantageous in this type of floor covering is the fact that it is very difficult to clean and that it has significant rolling resistance. The latter is disadvantageous especially in airports, railway stations, and the like, when passengers pull wheeled suitcases or carry-on luggage across the floor covering.

SUMMARY OF THE INVENTION

It is an object of the invention to provide a floor covering which is very durable, easy to clean, as little roll-resistant as possible, and not greatly subject to wear and tear.

It is a further object of the invention to provide such a floor covering which has the best possible appearance, even if it contains undesirable deformations, for example, as a result of the heels of women's shoes.

These and other objects of the invention are achieved by a floor covering made of an elastomer material having a relief-type patterned surface due to the fact that the surface is provided with irregularly distributed indentations, which have an elongated shape, which partially contact and/or intersect each other, and which have a depth of 0.02 mm to 0.2 mm at a width of 0.2 mm to 2.5 mm and a length of 5 mm to 50 mm. A floor covering of this type retains the excellent characteristics of a flat floor covering, having, for example, a very small rolling resistance and excellent cleaning properties, and the same time it has an improved appearance in that it produces an optically pleasant effect and also in that undesirable, small deformations do not become visible. The depth of the indentations is so small that visible deposits of dirt cannot develop. As a result of the selected shape of the indentations and their arrangement on the surface, an appearance is produced which is visually very attractive.

BRIEF DESCRIPTION OF THE DRAWINGS

The present invention will be described in greater detail with reference to the following drawings wherein.

DETAILED DESCRIPTION OF THE INVENTION

Figure 1:
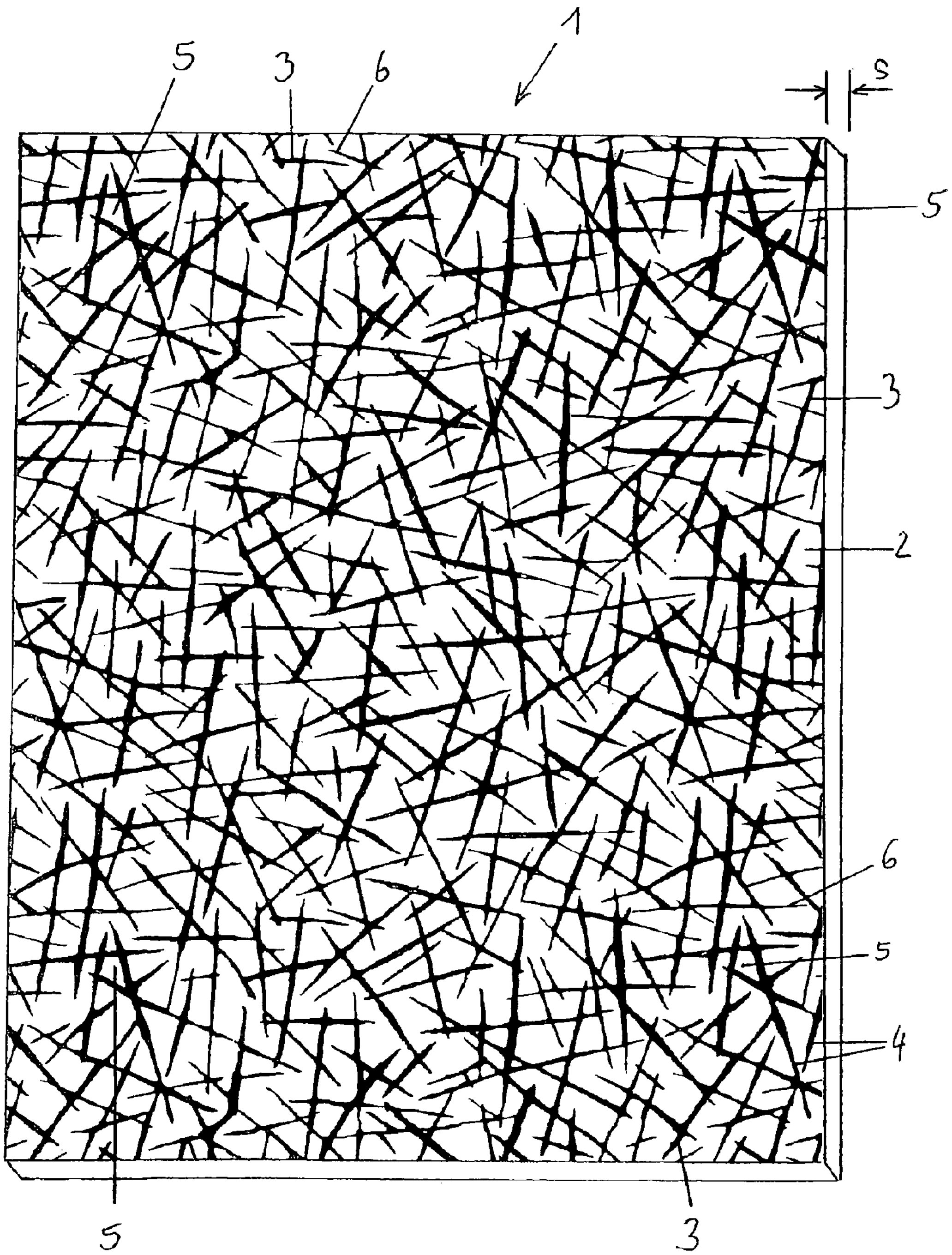
FIG. 1 is a top view depicting a segment of a floor covering 1 made of an elastomer material.

In the preferred embodiment, the indentations have a depth of 0.025 mm to 0.05 mm, at a width of 0.4 mm to 1.3 mm and a length of 6 mm to 40 mm. At least one end of the indentations is configured so as to run to a needle-like point. The indentations are distributed so that most of them intersect at least two other indentations. The indentations themselves have a shape each different from the other. Their surface proportion is 5% to 50%, preferably 20% to 40%, of the total surface of the floor covering. They have the same depth over their entire length. Their base, as a result, runs parallel to that of the percentage of floor covering that is not provided with indentations. The latter portion is configured so as to be planar in itself. The width as well as length of the individual indentations varies. In this context, at least one of the lateral border lines of the indentations at at least one location widens to the outside or to the inside. Preferably, the indentations are applied in the floor covering such that the floor covering is assembled from individual, repeating surface units.

For production-technical reasons, it is expedient if the floor covering is made up of a single-layer material. Its thickness is selected so as to be 2 mm to 5 mm, preferably 2.5 mm to 4 mm.

Thickness S of floor covering 1 is 3 mm. Referring to FIG. 1, its surface 2 is provided with irregularly distributed indentations 3, which have an elongated form in roughly the shape of needles. For illustrative purposes, they are indicated here in black, but in the original they have the same color as the surrounding surface. They are more or less randomly distributed over surface 2. Some of them are configured so as to run to a needle-like point at both ends. But there are also shapes which run to a point only on one end. The majority of indentations 3 intersect at least two other indentations 3. Only individual exceptions intersect only one other indentations 3. In the example, depth T of the indentations amounts to 0.025 mm, width B and length L being variable. The surface percentage of indentations 3 in the example amounts to roughly 28% of the entire surface of floor covering 1. Lateral border lines edges 4 of indentations 3 are preferably widened to the outside or narrowed to the inside. As a result, there is a variable width B over length L of indentations T. In the exemplary embodiment, a floor covering 1 is shown which is assembled from individual, repeating surface units. The Figure depicts one surface unit, which is bordered by triangle 5.

With respect to the rolling resistance and the measurement of sliding friction, the values listed in the table below were achieved in a comparison with a conventional napped product and a planar product.

| | rolling resistance at 20 kg load | | sliding friction measurement using Schuster device |
|---|---|---|---|
| Coverings | startup | rolling | pulling in kg |
| nap | 1.0 | 0.8 | 1.5 |
| surface acc to present invention | 0.8 | 0.6 | 1.7 |
| smooth/planar | 0.8 | 0.6 | 1.7 |

From the values, it is clear that a napped covering has a considerably higher rolling resistance. In rolling resistance, the product according to the present invention is indistinguishable in practice from a completely planar, smooth product. The same applies also to sliding friction.

What is claimed is:

1. A floor covering comprising: an elastomer material having a relief-type patterned surface, wherein the surface (2) is provided with irregularly distributed indentions (3), which have an elongated shape, which partially contact or intersect each other, and which have a depth (T) of 0.02 mm to 0.2 mm, at a width (B) of 0.2 mm to 2.5 mm and a length (L) of 5 mm to 50 mm wherein at least one end (6) of the indentation (3) is configured so as to run to a point, wherein the indentations are essentially straight and wherein the relief-type patterned surface minimizes roll resistance, wherein each indentation has a different shape from every other indentation.

2. The floor covering according to claim 1, wherein the indentations (3) have a depth (T) of 0.025 mm to 0.05 mm, at a width (B) of 0.4 mm to 1.3 mm and a length (L) of 6 mm to 40 mm.

3. The floor covering according to claim 1, wherein each indentation (3) intersects at least two other indentations (3).

4. The floor covering according to claim 2, wherein each indentation (3) intersects at least two other indentations (3).

5. The floor covering according to claim 1, wherein the surface percentage of the indentations (3) is 5% to 50% of the total surface of the floor covering (1).

6. The floor covering according to claim 5, wherein the surface percentage of the indentations (3)is 20% to 40% of the total surface of the floor covering (1).

7. The floor covering according to claim 1, wherein the indentations (3) have the same depth (T) over their entire length (L).

8. The floor covering according to claim 1, wherein the remaining surface (2) of the floor covering (1) is essentially planer.

9. The floor covering according to claim 1, wherein the width (B) of the individual indentations (3) varies.

10. The floor covering according to claim 1, wherein the length (L) of the individual indentations (3) varies.

11. The floor covering according to claim 1, wherein at least one of the lateral border edges (4) of the indentations (3) at at least one location widens, to the outside, or narrows, to the inside.

12. The floor covering according to claim 1, wherein the floor covering (1) is assembled from individual, repeating surface units.

13. The floor covering according to claim 1, wherein the floor covering (1) is made up of a single-layer material.

14. The floor covering according to claim 1, wherein the floor covering (1) has a thickness (S) of 2 mm to 5 mm.

15. The floor covering according to claim 14, wherein the floor covering (1) has a thickness (S) of 2.5 mm to 4 mm.

* * * * *